United States Patent [19]
Murray

[11] Patent Number: 5,238,734
[45] Date of Patent: * Aug. 24, 1993

[54] RAILROAD TIES MADE OF RECYCLED TIRE FRAGMENTS

[76] Inventor: Kevin N. Murray, 2153 Wilmer Rd., Wentzville, Mo. 63385

[*] Notice: The portion of the term of this patent subsequent to Mar. 10, 2009 has been disclaimed.

[21] Appl. No.: 848,655

[22] Filed: Mar. 9, 1992

Related U.S. Application Data

[63] Continuation-in-part of Ser. No. 479,370, Feb. 13, 1990, Pat. No. 5,094,905.

[51] Int. Cl.$^5$ .............................................. B32B 3/00
[52] U.S. Cl. ................................ 428/292; 428/317.1; 428/903.3; 238/1; 238/29; 238/83
[58] Field of Search ............... 428/218, 317.1, 903.3; 238/1, 29, 83

[56] References Cited

U.S. PATENT DOCUMENTS

| | | | |
|---|---|---|---|
| 2,892,592 | 6/1959 | Greene et al. | 238/283 |
| 2,977,864 | 4/1961 | Pullar | 94/22 |
| 3,081,035 | 3/1963 | Meyer | 238/283 |
| 3,801,421 | 8/1974 | Allen | 238/283 |
| 4,244,841 | 1/1981 | Frankland | 260/2.3 |

FOREIGN PATENT DOCUMENTS 1586882 3/1981 United Kingdom .

*Primary Examiner*—Patrick J. Ryan
*Assistant Examiner*—Elizabeth Evans
*Attorney, Agent, or Firm*—Haverstock, Garrett and Roberts

[57] ABSTRACT

This invention relates to the use of rubber fragments from discarded tires in railroad ties. Such ties are made using rubber fragments which contain steel, polyester, or other strands or fibers, and which therefor are less expensive to prepare than fragments from which the reinforcing strands have been removed. These fragments are mixed with an epoxy mixture comprising an oxirane-containing resin and an amine-containing hardening agent. Test samples made using the materials described herein have excellent hardness, strength, durability, and nail-gripping characteristics.

8 Claims, 2 Drawing Sheets

2

RAILROAD TIES MADE OF RECYCLED TIRE FRAGMENTS

RELATED APPLICATION

This application is a continuation-in-part of application Ser. No. 479,370, filed on Feb. 13, 1990, which issued as U.S. Pat. No. 5,094,905 on Mar. 10, 1992.

BACKGROUND OF THE INVENTION

This invention involves a use for rubber scrap from discarded automobile tires.

It has been estimated that roughly 3 billion discarded tires from automobiles and trucks litter the American landscape, and 200 million more are discarded every year. Although some discarded tires are dumped offshore to create fishing reefs, that method of disposal is impractical for tires located long distances from coastlines. Most discarded tires sit in open dumps, where they collect rainwater and serve as breeding grounds for mosquitos, rats, and other pests. More information on various problems relating to the disposal or recycling of discarded tires is contained in the introductory section of U.S. Pat. No. 4,726,530 (Miller and Priscu 1988).

Various machines have been developed to cut, grind, or shred discarded tires into fragments. Such machines are disclosed in, e.g., U.S. Pat. Nos. 3,561,308 (Ehrlich 1971), 4,405,090 (Wakeem 1983), 4,422,581 (Chryst 1983), and 4,757,949 (Horton 1988).

More elaborate systems that can remove strands or pieces of steel, fiberglass, polyester, nylon, or other materials used in the reinforcing belts, so that the remaining purified rubber fragments can be chemically processed, are described in various other patents such as U.S. Pat. Nos. 4,726,530 (Miller and Priscu 1988) and 4,813,614 (Moore and Aten 1989). However, such additional processing tends to be relatively expensive.

A number of proposals have been made for using rubber from recycled tires in various shaped forms. These uses involve mixing the rubber an adhesive such as asphalt (e.g., U.S. Pat. No. 2,977,864, Pullar 1961), a sulfur compound (see U.S. Pat. No. 4,244,B41, Frankland 1981), or a thermosetting resin (e.g., U.S. Pat. No. 3,344,094, deGaugue 1967) to create a viscous, sticky mixture which is cured or dried to create a dry solid article. Some of these of items of prior art also state that fibers or additional components are necessary to provide adequate strength for the intended uses. In some cases, the adhesive mixture is spread in a relatively thin layer across a flat surface and allowed to dry, thereby forming a rubberized and somewhat cushioned surface which adheres tightly to the surface it is placed upon (see, e.g., U.S. Pat. No. 3,801,421, Allen et al 1974). In other cases, the mixture is placed in a mold and cured to create a desired shape.

A number of patents state that items made from recycled tire fragments can be used as railroad tie pads. Railroad tie pads are not the same as railroad ties. A railroad tie (also called a cross-tie) is a large piece of wood, usually about 7 by 9 inches (about 18 by 23 cm) thick and about 8 feet (2.5 meters) long; each railroad tie rests beneath both rails on a railroad track. By contrast, a tie pad is a much smaller flat piece which is almost square and which rests beneath a single steel rail, on top of a single wooden tie; a tie pad has a hole in its center, through which a railroad spike passes. The tie pad helps dampen and suppress motion by the spike, which otherwise would vibrate and move excessively when a train is passing across the rail. In this manner, tie pads help prolong the useful lives of the railroad ties. By using rubber tie pads beneath the steel rails, it is possible to provide a small but significant degree of cushioning for both the train and the track. U.S. patents which describe the use of tie pads made of recycled tire particles include U.S. Pat. Nos. 2,686,009 (Crowe 1954); 2,713,013 (Spokes 1955); 2,880,127 (Spokes 1959); 2,886,248 (Laudig 1959); 2,892,592 (Greene and Thurston 1959); and 3,081,035 (Meyer 1963).

Another item of prior art relating to molded mixtures containing rubber particles from recycled tires is British patent GB 1 586 882 (assigned to the Winson Luxemburg company; published on Mar. 25, 1981). This British patent requires particular attention since it mentions, in passing, the possibility of using the molded items as railroad ties, which is the subject matter of the current disclosure. GB patent 1,586,882 states that a "particulate synthetic thermoplastic resin material" should be used as the adhesive, but it provides no additional or specific information on such adhesives. It also provides no information on the molding or curing process, except to say that the initial mixture should contain both "molten" tire particles mixed with adhesive, and non-molten tire particles. It also states that: (1) all metal particles should be removed from the rubber, which will greatly increase the cost of obtaining such particles from steel-belted tires; (b) the rubber should be mixed with 20 to 50 percent plastic or fiberglass, preferably obtained from waste material; and, (c) if 50% of the material is plastic rather than rubber, then the material is relatively non-porous, but if only 20% plastic is used, the resulting mix become highly porous. It asserts that the resulting molded items can be used as flower pots, minnow pails, garbage cans, and buckets. It also asserts that such articles can also be used as railroad ties, but it contains no information to indicate that the necessary strengths or durabilities for such use can be achieved, and it makes the unsupported assertion that such items would be "obviously less expensive than currently used counterparts ... "

In point of fact, the work done by the Applicant indicates that the cost of each tie made of recycled rubber particles will be substantially higher than the cost of wooden railroad ties. The typical cost of a wooden railroad tie, including the cost of treating it with creosote to prevent fungal or insect attack or other deterioration, is about 20 to 30 dollars, which does not include installation cost. By comparison, the cost of a railroad tie made of recycled tire particles, using a type of adhesive which is suitable for use in railroad ties and in sufficient quantity of adhesive to ensure complete adhesion to eliminate the danger of cracking in areas that have not been adequately contacted by adhesive, is currently in excess of $50 per tie.

Nevertheless, the Applicant has discovered that in some situations, railroad ties made of recycled rubber are sufficiently strong and durable to render them economically feasible and even preferable in some environments where wooden ties have short lifespans. This is especially true in regions with frequent snow or rain that are subject to frequent cycling above and below the freezing point of water; the frequency of cycling above and below freezing is more important than average temperatures, since each time the temperature drops below freezing, any rainfall or melted snow which has coated or seeped into the tie will freeze, and the expansion of the ice as it freezes forces apart the fibers in the wood, causing it to crack and split. In some environments, wooden ties show substantial signs of wear within two or three years, and must be replaced often to ensure adequate margins of safety for the trains passing over them. Replacement is a very expensive process; the cost of labor, new spikes, new tie pads, lost travel time on the rails, and other related expenses for removing cracked ties and installing new ties beneath a railroad usually amount to substantially more than the cost of the ties.

Accordingly, despite the availability of machinery for cutting, grinding, or shredding tires into fragments of any desired size, and despite the existence of numerous patents and other publications which suggest various uses for rubber fragments from recycled tires, the fact remains that millions of discarded tires continue to be added every year to open dumps, where they become eyesores and breeding grounds for pests. Not enough practical and economic uses have been undertaken to actually use and recycle discarded tires.

Therefore, one object of the subject invention is to disclose a method of using rubber fragments obtained from discarded tires, in railroad ties which can be placed beneath railroads in an economically feasible and competitive manner.

Another object of the invention is to provide a use for discarded tires which can utilize fragments of rubber without requiring expensive processing to remove strands of steel, fiberglass, polyester, nylon, or other reinforcing material from the rubber.

A third object of the subject invention is to provide a method of recycling discarded tires into products that will substitute for lumber in railroad ties, thereby reducing the number of trees that must be cut down in order to provide products that people need.

SUMMARY OF THE INVENTION

This invention relates to the use of rubber fragments from discarded tires in railroad ties. Such ties are made using rubber fragments which contain steel, polyester, or other strands or fibers, and which therefor are less expensive to prepare than fragments from which the reinforcing strands have been removed. These fragments are mixed with an epoxy mixture comprising an oxirane-containing resin and an amine-containing hardening agent. Test samples made using the materials described herein have excellent hardness, strength, durability, and nail-gripping characteristics.

DESCRIPTION OF THE PREFERRED EMBODIMENTS

This invention discloses molded railroad ties having sufficient strength and durability to render them suitable for prolonged use beneath a railroad track, constructed of rubber fragments from discarded tires, mixed with an epoxy adhesive and bonded together.

Figure 1:
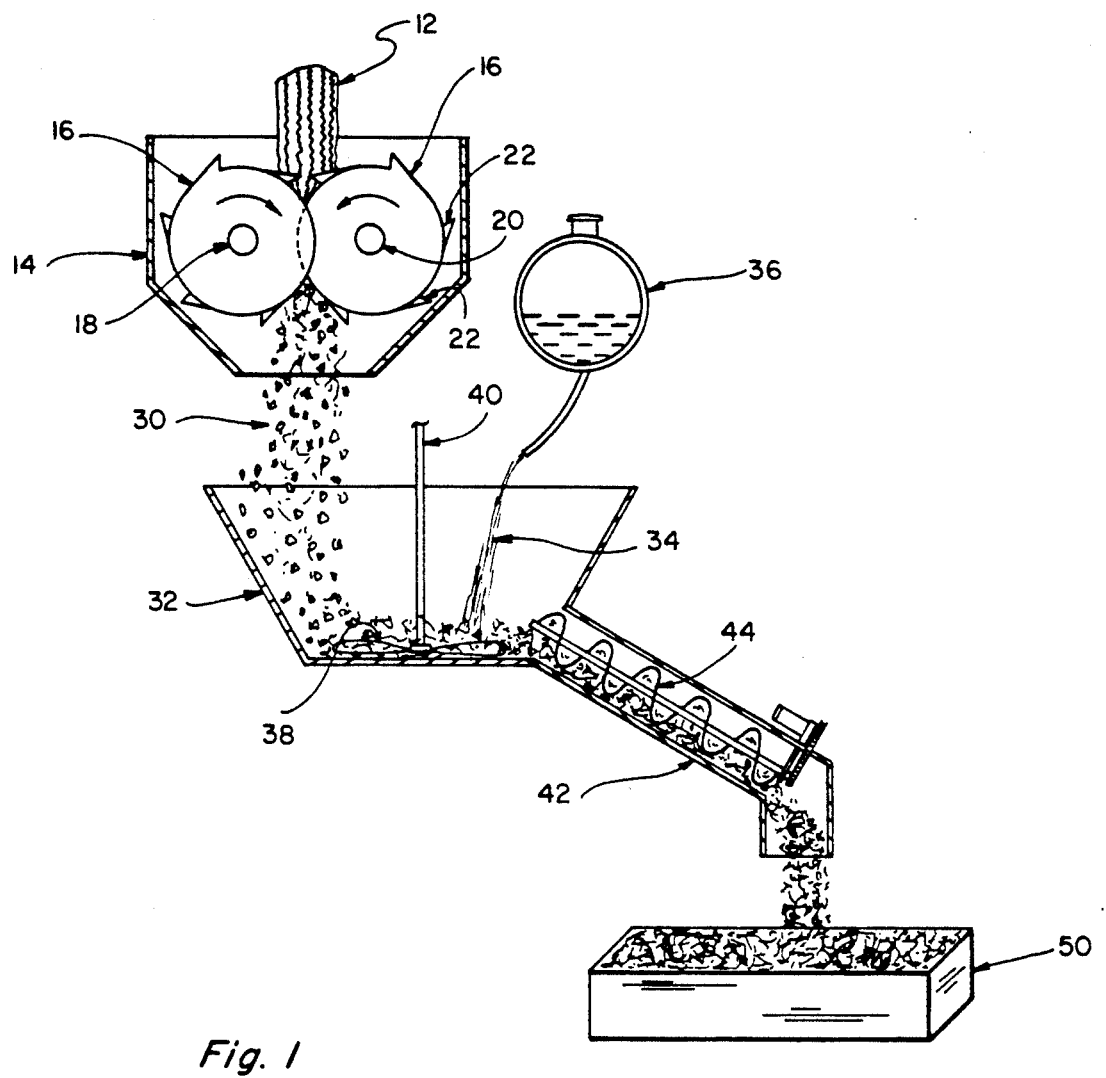
FIG. 1 is a schematic drawing of the machinery for carrying out the steps of the subject invention.
Figure 2:
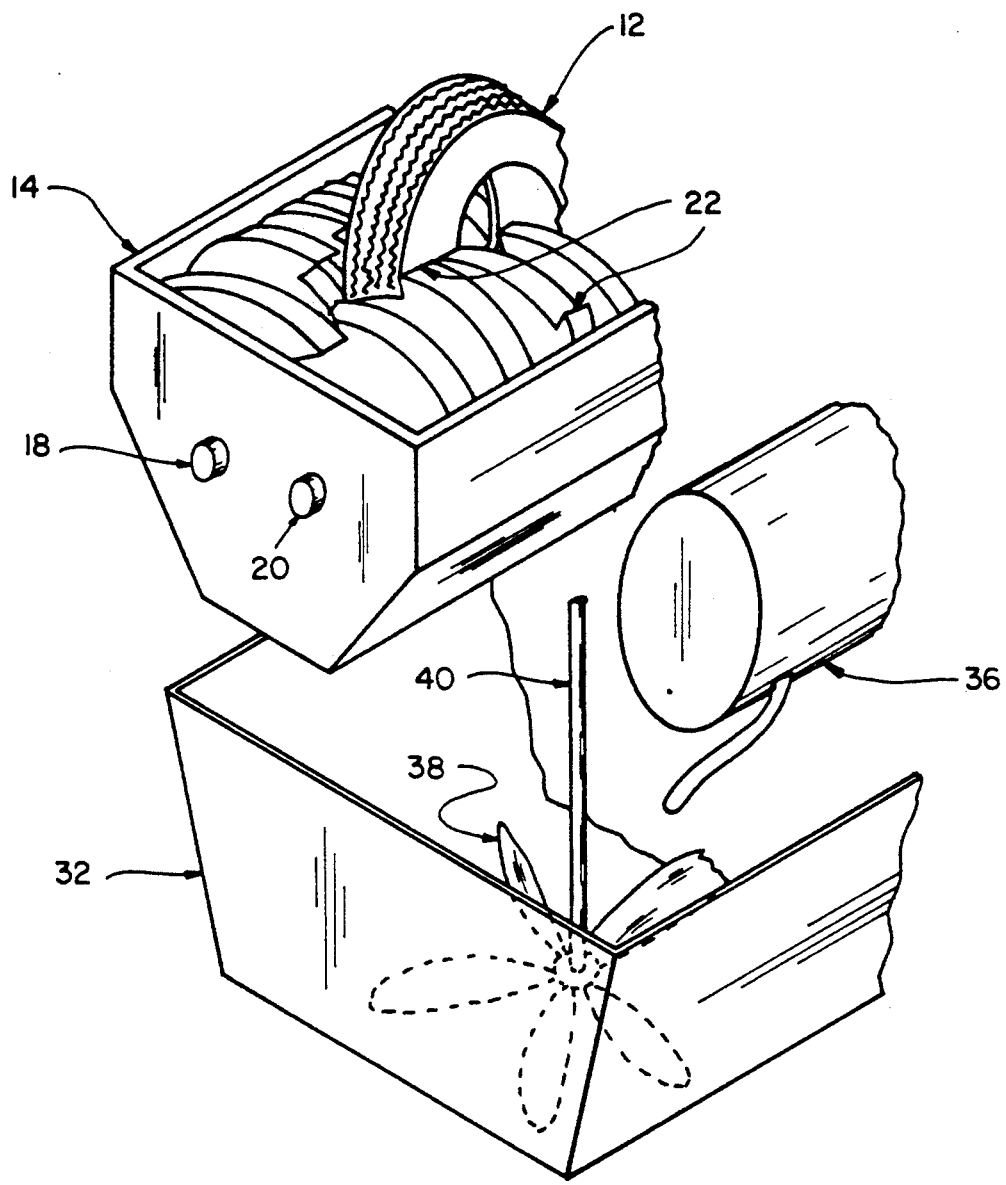
FIG. 2 is a perspective view of the grinding machine and mixing device of the subject invention.

In one preferred method for creating the articles of the subject invention, shown in FIG. 1, discarded tires 12 from automobiles, trucks, tractors, trailers, or any other type of vehicle which uses rubber tires are used as a raw material. Such vehicular tires need not be recently discarded; since tires are remarkably durable, discarded tires that have been sitting in dumps for more than a year can be used if desired, provided that they can pass a visual inspection to ensure that they do not suffer from severe oxidative degradation, which generates a pattern of weathered cracks on the outer surfaces which would interfere with good bonding by an adhesive. Very old or heavily weathered tires preferably should not be used in railroad ties, unless adequate surface preparation (such as scraping with wire-bristle brushes or use of a dilute acid wash) is used to remove the weathered outer layer.

Foreign matter such as dirt should be removed using a hose and a spray nozzle with water, either by an operator or in a washing chamber. If desired, the tires (or the fragments obtained from the tires) can be further washed to remove grease and other contaminants that are not water soluble, using detergent, solvent, a dilute acid wash, or other suitable means. To minimize the cost of any such cleaning procedure, the tires can be divided into categories such as clean, slightly greased, and heavily greased. Each category can be treated appropriately.

Tires 12 are loaded into a cutting, grinding, or shredding machine 14, to convert the tires into fragments 30. A variety of suitable machines have been developed for this purpose, such as the machines described in U.S. Pat. Nos. 3,561,308 (Ehrlich 1971), 4,405,090 (Wakeem 1983), 4,422,581 (Chryst 1983), and 4,757,949 (Horton 1988). Shredding machine 14 as shown in FIG. 1 comprises a set of interacting rotating disks 16, mounted on axles 18 and 20, with blades 22 dispersed around the circumferences of disks 16, comparable to the rotating disk systems shown in U.S. Pat. Nos. 4,757,949 and 4,726,530. The rows of disks are rotated in opposite directions, so that they pull the tires 12 down between them.

If desired, the cutting process can be done in multiple stages. For example, a first cutting or shredding step can be used to cut the tires into sections or strips, or to shred the tires into large chunks having diameters of several inches. A second step can follow wherein the sections, strips, or chunks are shredded or ground into fragments. Using appropriate cutting, shredding, or grinding steps coupled with sorting devices (which usually involve sifting the chunks or fragments through metallic grates), the tires can be reduced to fragments 30 having any desired size range. In general, devices such as shredders or hammer mills are preferred for generating relatively large fragments (e.g., about $\frac{3}{8}$ inch in diameter or larger), while grinders may be preferred for generating relatively small fragments (e.g., less than about $\frac{1}{4}$ inch).

Various companies and contractors already run tire shredding machines. The rubber fragments used as described herein can be purchased from such a company, or they can be created on-site at the facility which makes the articles of this invention if the necessary machinery is available at that location.

A key feature of the subject invention is that the rubber fragments 30 do not need to be treated by a process to remove strands of steel, fiberglass, polyester, or nylon, which are commonly used to provide reinforcing belts in tires. Such purification, which is often necessary if the rubber will chemically recycled, is very expensive both in terms of equipment cost and processing costs. By avoiding the need for purifying the rubber, the subject invention makes it much more economical to convert discarded tires into economically competitive railroad ties.

After the tires 12 have been fragmented into a suitable size range, the fragments 30 are loaded into a mixing bin 32. An adhesive 34 from a storage tank 36 is added to mixing bin 32, which mixes the fragments and adhesive together and coats the fragments with adhesive, using devices such as paddles 38 which are mounted on rotating axle 40. Various other methods of mixing can be used if desired; for example, adhesive can be sprayed onto the fragments while the fragments lie on a shaker table. In general, the mixing should be sufficiently thorough to ensure that all surfaces of the rubber fragments are coated with adhesive.

The rubber fragments should be blended with the adhesive in a ratio which provides sufficient adhesive to coat all surfaces of the rubber particles. The preferred ratio may vary somewhat depending on factors such as the viscosity of the adhesive during the mixing step (which can be controlled to some extent by means of volatile solvents), and the sizes and shapes of the rubber fragments. In particular, the fragments preferably should have roughly convex shapes, with no small crevices or depressions that might not be readily contacted by a highly viscous adhesive. When using the epoxy compounds discussed below, the Applicant has found that a ratio of about 1 part epoxy mixture to about six parts rubber (by weight) provides exceptionally durable products. This ratio probably can be improved by optimizing the mixing and reaction conditions and by experimentation with various thinners for the epoxy; accordingly, this invention anticipates a ratio of one part epoxy adhesive to about four to eight parts rubber particles, by weight.

The mixture is then conveyed, using equipment such as a trough 42 equipped with an auger 44 if necessary, into a mold cavity 50 or compaction bin which has or which can assume a desired shape, such as a rectangular beam with the dimensions of a standard-sized railroad tie. Although exact sizes vary in different countries, the standard size for a railroad tie in the U.S. is about 7 inches by 9 inches thick, by about 8.5 feet long.

A preferred type of mold comprises a three-walled trough with square corners, and a movable top. This allows a suitable pressure (preferably ranging from several hundred pounds per square inch (psi), up to about 2,000 psi) to be applied to the top and/or sides of the mold, using a device such as a hydraulic press. This pressure it ensures that the entire mold cavity is filled, to eliminate or minimize undesired vacancies or air pockets that can result when a highly viscous and sticky mixture is poured into a mold; it also reduces the porosity and permeability of the resulting article, making it more solid and durable, and it forces the fragments of rubber into closer contact with the adhesive, thereby increasing the bonded surface area and the tightness of the adhesive bonds.

However, exceptionally high pressures (such as several thousand psi) should not be used, since they can deform the rubber particles to an undesirable extent; after the pressure is removed, deformed particles will try to return to their original shape, which can generate unwanted stress inside the tie.

The curing process can also involve heat if desired, depending on the particular type of adhesive used. In general, mild heat usually accelerates the chemical bonding process in epoxies, which will reduce the amount of time that a batch of mixed particles and adhesive must be kept in the mold. Some epoxies also have thermosetting properties; the necessary chemical bonds will not be created unless the temperature rises to a certain level.

If desired, a device such as a table press which has an array of rectangular mold cavities can be used to mold a number of railroad ties simultaneously. Alternately, a large slab can be created and then sawed into the desired sizes.

If desired, the inside of a mold cavity can be coated with a layer of material such as plastic, or an anti-stick substance such as a thin layer of grease or a silicon spray, before the mold is filled with a mixture of rubber and adhesive. Alternately or additionally, the interior surfaces of the mold can be made of a polished or smooth metal such as stainless steel. Any of those techniques will minimize sticking of the shaped articles to the mold, and will simplify the removal of the article from the mold.

If desired, the rubber fragments can be mixed with rubber strips (which can be created by cutting rather than grinding old tires) or other reinforcing cords made of material such as nylon rope, to provide additional tensile reinforcement. Additionally or alternately, the articles of this invention can be constructed around reinforcing metal bars, such as the typical rough-surfaced steel reinforcing bars used to reinforce concrete.

Preferred Epoxy Adhesives

This invention rests upon the fact that epoxy adhesives have been identified which provide the following useful characteristics:

1. they render the molded item highly stiff, in a manner comparable to hardwood, without being brittle (like concrete) or rubbery and deformable (like soft or porous rubber). Sample materials made as described herein can be directly hit with heavy blows by a steel-headed hammer wielded by a large and strong man, without denting, tearing, or damaging the material in any way, and without any danger of chipping the steel face of the hammer.

2. they render the molded item well-adapted to accepting a nail or spike, which can be driven into the material without creating a split or crack. If a full-sized spike is used, a pilot hole can be drilled beforehand to minimize stress in the material in the area immediately adjacent to the spike. The material shows excellent gripping characteristics which are not affected by vibrational movements, lateral forces, or pulling forces on the nail or spike.

3. unlike wood, neither the rubber nor the adhesive have a significant tendency to absorb water. Therefore, less water will permeate into cracks or pores in molded ties compared to wooden ties, and less wear and damage will occur due to repeated freezings under wet conditions. Even if water does fill cracks or pores in a molded tie, the expansion of the water as it freezes it will merely deflect and deform the area of rubber immediately surrounding the water pocket, and the rubber will return to its normal shape when the ice melts again. This type of compliant yielding will minimize or avoid any damage or crack formation.

4. the rubber in tires is designed to last for many years without substantial chemical deterioration, and the chemical bonds formed by high-quality epoxy adhesives are also designed to last for many years (some epoxy manufacturers state that their products will last for fifty years or more, even under outdoor weathering conditions). Based on relevant information for both tire particles and selected epoxies, it appears that railroad ties made with tire particles and high-quality epoxy can last for more than thirty years in adverse conditions that cause severe degradation of wooden ties in less than ten years.

The length-of-service factor is highly important. As mentioned above, it is very expensive to replace wooden ties under an existing railroad track; the cost of installation is much higher than the cost of the ties. Accordingly, ties made of molded tire particles which can last several times longer than wooden ties are economically competitive even though they have a significantly higher initial cost.

Out of the various types of epoxy tested to date, the particular type which has the highest strength characteristics is sold by Resin Technology Group (Easton, Massachusetts). The resin component is referred to as "Oxy-Cast" or "Oxy-Bond" and uses oxirane rings at both ends of a spacer molecule, as discussed below; additional trade designations such as "Oxy-Cast 100" or "Oxy-Bond 105" are used to indicate specific formulations, which contain variations in things such as the spacer molecule. Any hardening agent containing two or more accessible reactive amine groups can be used with this type of resin; the RT-1 (which can cure at room temperature) hardener has been tested and shown to provide good results. When cured, Oxy-Cast 100 epoxy used with RT-1 hardener has the following characteristics:

| Hardness (Shore D) | 75 |
| Compressive strength | 10,000 psi |
| Tensile strength | 6,000 psi |
| Flexural strength | 20,000 psi |

It is used by mixing 15 parts of the hardener with 100 parts of the resin. The resin and hardener preferably should be mixed before being added to the rubber particles. The pot life is about 30 minutes at 25° C. The epoxy will set in 24 hours at room temperature, or it will set in 2 hours if heated to 150° F. (65° C). It should be cured for 72 hours before subjecting it to any loads.

To the best of the Applicant's knowledge, the resin component of this epoxy contains an organic spacer chain with two or more phenol (aromatic) groups, coupled to adjacent carbon atoms by means of ether linkages. A chemical structure containing two phenol groups in a symmetric arrangement wherein the ring structures are separated by at least one atom is called a bis-phenol structure; the structure shown below contains several bis-phenol structures, and it also contains an oxirane ring structure (also called an epoxide structure) at each end of the spacer chain, as follows:

viscosity renders them less suited for contacting every surface in a batch of particles.

Since resins of this type are usually created using a halogenated chemical called epichlorohydrin. Therefore, even though only very small quantities of epichlorohydrin are present in the resin itself, these resins are often called epichlorohydrin-based resins.

When oxirane resins are reacted with hardening agents containing two or more accessible amine groups, such as aliphatic amines (i.e., aliphatic chains having primary amine groups at both ends), polyamidoamines, polyamides, or modified cycloaliphatic amies, the accessible amine groups react with the oxirane rings to generate covalent bonds. At the same time, the amine groups and/or the oxirane rings (and possibly other reactive groups which are present in the spacer chains) also react with various molecular moieties on the surfaces of the substrate, to covalently bond the epoxy composition to the substrate. Since two reactive groups in a resin or hardener molecule will usually bind to reactive groups on two different molecules (either in the epoxy or on the surface of the substrate), this generates a network of interconnected molecules which can be regarded, for practical purposes, as a single polymerized molecules with numerous attachment points to each substrate surface.

As is known to those skilled in the art of epoxy chemistry, various other types of hardening agents can also be used in combination with oxirane resins, if desired. However, they tend to be more expensive than amine hardeners, so they are not discussed in detail herein. In addition, various solvents can be used if desired to reduce the viscosity of the epoxy mixture. The most effective solvents include agents such as methylene chloride, trichloroethane, and methyl ethyl ketone.

If an epoxy mixture such as Oxy-Cast 100 with RT-1 hardener is prepared and allowed to set by itself, with no substrate to bond to, it will create an exceptionally hard mass which is somewhat rigid and brittle. However, if the epoxy is mixed with rubber particles from tires as described herein, the resulting mass has a texture that is quite comparable to hardwood, with a somewhat higher density. It is not brittle and will yield enough to prevent cracking or other damage even if hit very hard by a hammer. It can also be sawed if desired, generating a fairly clean planar surface.

Thus, there has been described herein a class of molded railroad ties, and a method for constructing such railroad ties from used tires, which satisfies all the objectives set forth above, and which provides a highly useful way to recycle a major type of solid waste while reducing the need to cut down trees. Although this invention has been described with respect to certain specific embodiments, those skilled in the art will recog-

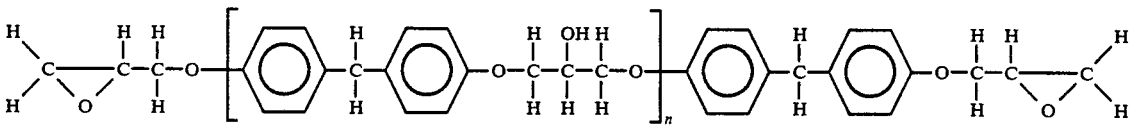

where n is a relatively small integer such as 1 or 2. The size of the molecule can also be expressed as an "epoxide equivalent weight." Preferred formulations should contain relatively small epoxide equivalent weight, such as in the range of about 170 to 205 daltons or less. Larger resin molecules tend to have increased viscosity; although this can be useful for some applications, higher nize that various alterations and modifications may be made to those embodiments without departing from the scope and spirit of this invention. Such equivalents are within the scope of this invention, which is limited only by the claims that follow.

I claim:

1. A molded railroad tie having sufficient strength and durability to render it suitable for prolonged use beneath a railroad track, constructed of rubber fragments mixed with an epoxy adhesive and bonded together, the rubber fragments being produced by fragmenting rubber-containing tires, wherein strands of steel and other reinforcing materials present in the tires have not been removed, and wherein the molded railroad tie is formed under pressure in a mold for a time period sufficient for the epoxy adhesive to set.

2. The molded railroad tie of claim 1 wherein the epoxy adhesive comprises, as one component, a resin compound containing molecules having two or more oxirane reactive groups.

3. The molded railroad tie of claim 2 wherein the resin compound comprises bis-phenol groups in spacer chains positioned between the oxirane reactive groups.

4. The molded railroad tie of claim 2 wherein the hardener compound contains molecules having two or more reactive amino groups per molecule.

5. The molded railroad tie of claim 1 wherein the rubber fragments are blended with the adhesive in a ratio of one part epoxy to about four to eight parts rubber particles, by weight.

6. The molded railroad tie of claim 1, containing strips of rubber incorporated therein which are sufficiently long to provide reinforcement against tensile stresses.

7. The molded railroad tie of claim 1, containing fibrous material incorporated therein with strands of material that are sufficiently long to provide reinforcement against tensile stresses.

8. A molded railroad tie having sufficient strength and durability to render it suitable for prolonged use beneath a railroad track, constructed of rubber fragments mixed with an epoxy adhesive and bonded together, wherein the epoxy adhesive somprises the residue of a resin compound containing oxirane reactive groups and a hardener compound containing amine reactive groups.

* * * * *

UNITED STATES PATENT AND TRADEMARK OFFICE
CERTIFICATE OF CORRECTION

PATENT NO. : 5,238,734
DATED : August 24, 1993
INVENTOR(S) : Murray

It is certified that error appears in the above-indentified patent and that said Letters Patent is hereby corrected as shown below:

Column 1, line 43 "4,244,B41" should be -- 4,244,841 --.

Signed and Sealed this

Sixth Day of September, 1994

Attest:

BRUCE LEHMAN

Attesting Officer        Commissioner of Patents and Trademarks